United States Patent
Van Guilder et al.

(10) Patent No.: US 8,306,807 B2
(45) Date of Patent: Nov. 6, 2012

(54) STRUCTURED DATA TRANSLATION APPARATUS, SYSTEM AND METHOD

(75) Inventors: Linda C. Van Guilder, Oakton, VA (US); Jennifer B. Doyon, Lovettsville, VA (US); Michael E. Martinka, Vienna, VA (US); Jon B. Phillips, New York, NY (US); Kristian J. Concepcion, New York, NY (US); Robert C. Muir, Reston, VA (US)

(73) Assignee: N T repid Corporation, Herndon, VA (US)

( * ) Notice: Subject to any disclaimer, the term of this patent is extended or adjusted under 35 U.S.C. 154(b) by 642 days.

(21) Appl. No.: 12/461,574

(22) Filed: Aug. 17, 2009

(65) Prior Publication Data

US 2011/0040552 A1   Feb. 17, 2011

(51) Int. Cl.
*G06F 17/28* (2006.01)
(52) U.S. Cl. .................. 704/4; 704/9; 704/257
(58) Field of Classification Search .............. 704/1–10, 704/177, 251, 255, 257
See application file for complete search history.

(56) References Cited

U.S. PATENT DOCUMENTS

| | | | |
|---|---|---|---|
| 7,475,005 B2* | 1/2009 | Itoh et al. | 704/5 |
| 8,145,473 B2* | 3/2012 | Anisimovich et al. | 704/4 |
| 2002/0111941 A1 | 8/2002 | Roux et al. | |
| 2004/0186706 A1 | 9/2004 | Itoh et al. | |
| 2006/0245641 A1 | 11/2006 | Viola et al. | |
| 2009/0070099 A1 | 3/2009 | Anisimovich et al. | |
| 2009/0144049 A1 | 6/2009 | Haddad et al. | |

OTHER PUBLICATIONS

International Search Report International Application No. PCT/US 10/37947 dated Aug. 5, 2010.

* cited by examiner

*Primary Examiner* — Huyen X. Vo
(74) *Attorney, Agent, or Firm* — Squire Sanders (US) LLP

(57) ABSTRACT

An apparatus is provided that includes a processor and a memory. The processor is configured to determine a category for a group of isolated noun phrases in a structured or semi-structured data source stored in the memory. The group of isolated noun phrases includes one or more isolated noun phrases. The processor is also configured to translate the group of isolated noun phrases from a source language to a target language using a category-driven isolated noun phrase translation. The determination of the category and the category-driven isolated noun phrase translation are performed based on context derived from the group of isolated noun phrases.

24 Claims, 9 Drawing Sheets

STRUCTURED DATA TRANSLATION APPARATUS, SYSTEM AND METHOD

FIELD

Embodiments generally relate to data translation applications, and in particular to an apparatus, system and method of translating structured or semi-structured data.

BACKGROUND

Automatic machine translation engines may be designed for general purpose translation of whole sentences, making use of linguistic context to perform translations. Examples of such applications include Systran®, Language Weaver®, Apptek®, LogoMedia/LEC®, and Google Translate®. However, with respect to structured data found in databases and spreadsheets, or semi-structured data that is extracted from full text via an information extraction engine, frequent translation errors occur due to a lack of knowledge of a category for noun phrases ("NPs") for the structured or semi-structured information. For example, the Russian names "Sergey Lozhechko" and "Shedrov Aleksandr" should be left alone, or transliterated. Transliteration involves changing characters of one language into corresponding characters of another language. For instance, the Greek "X" may be transliterated into English as "ch". However, these names could instead be literally translated as "Sergey spoon" and "generous Alexander", respectively, without an understanding by the system that it is dealing with names of people. Similarly, the Russian word "проспект" means "street" in the context of an address, but means "brochure" or "prospectus" in the context of a document type. Such errors due to a lack of linguistic or natural language context that is present in higher level units of linguistic analysis, such as sentences, paragraphs and full text documents, may render conventional automatic machine translation engines inaccurate for translating noun phrases in structured or semi-structured data.

SUMMARY

In an embodiment, an apparatus includes a processor and a memory. The processor is configured to determine a category for a group of isolated noun phrases in a structured or semi-structured data source stored in the memory. The group of isolated noun phrases includes one or more isolated noun phrases. The processor is also configured to translate the group of isolated noun phrases from a source language to a target language using a category-driven isolated noun phrase translation. The determination of the category and the category-driven isolated noun phrase translation are performed based on context derived from the group of isolated noun phrases.

In another embodiment, a method for performing automatic machine translation of isolated short and proper noun phrases includes determining a category for a group of isolated noun phrases in a data source. The group of isolated noun phrases includes one or more isolated noun phrases. The method also includes translating the group of isolated noun phrases from a source language to a target language using a category-driven isolated noun phrase translation. The determination of the category and the category-driven isolated noun phrase translation are performed based on context derived from the group of isolated noun phrases.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered as limiting of its scope, the invention will be described and explained with additional specificity and detail through the use of the accompanying drawings, in which.

DETAILED DESCRIPTION

Figure 1:
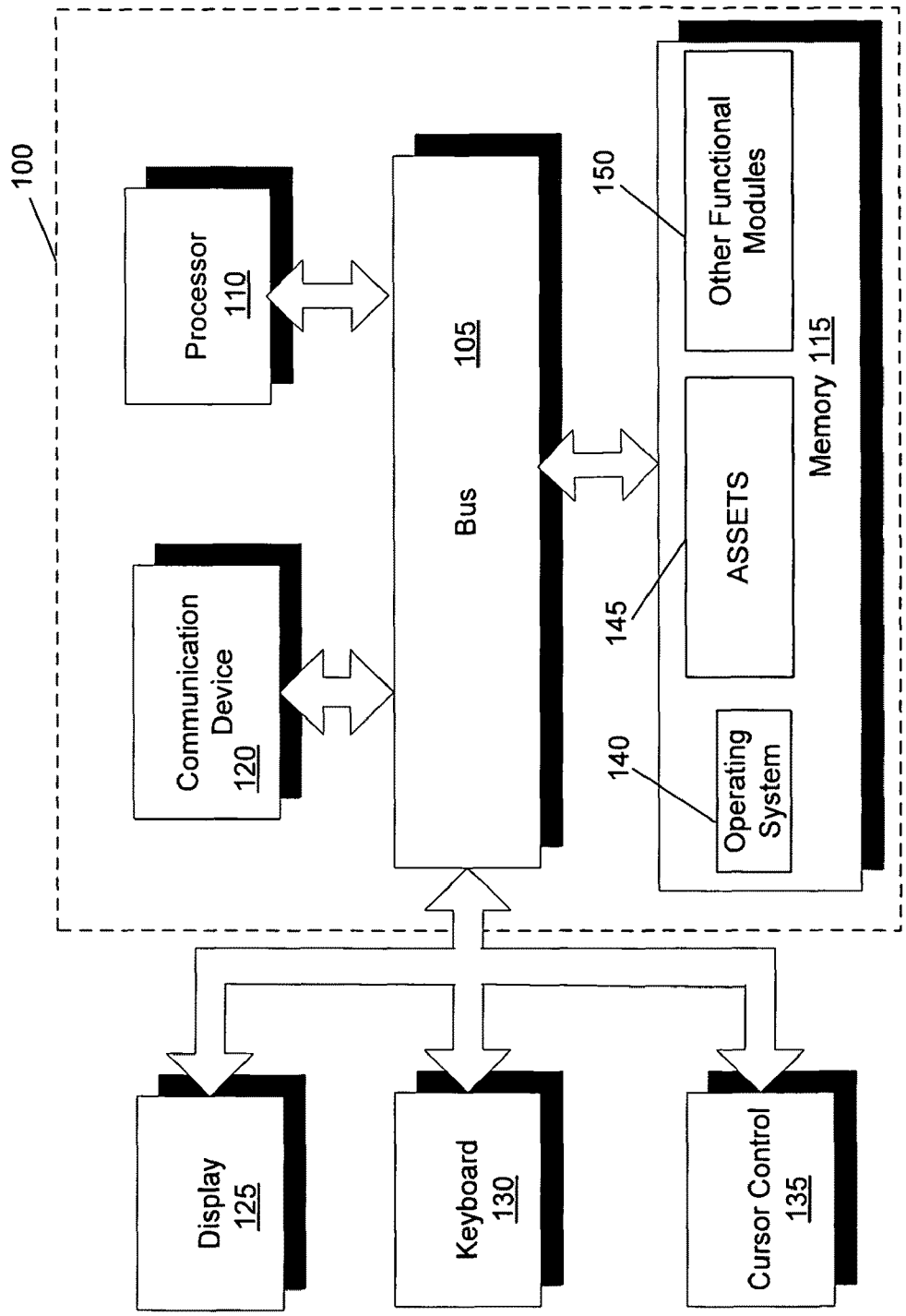
FIG. 1 is a block diagram illustrating an Automatic Semi-Structured Entity Translation System ("ASSETS") server, according to an embodiment of the present invention.

Some embodiments include an apparatus, a system, and an automatic machine translation ("MT") method for performing automatic MT of isolated short and proper noun phrases. Some embodiments also include a system for translating structured and semi-structured data using the automatic MT method. Under one definition, a noun phrase is a single noun, pronoun or adjective, or a group of words containing at least one noun, pronoun or adjective (and no verb) that function together as a noun, pronoun or adjective. The group of words that function together as a noun, pronoun or adjective may include parts-of-speech such as nouns, pronouns, adjectives, adverbs, determiners and conjunctions, but no verbs. For example, all of the following are noun phrases for the purposes of ASSETS: "boy", "the boy", "the small boy", "the small boy in the garden", "the small boy in the garden with the ice cream", "small", "very small" and "XL". The precise labels for the parts-of-speech depend on the syntactic model used to describe a language. For example, the part-of-speech called "determiner" can be further sub-classified as articles, demonstratives, possessive pronouns, quantifiers, etc. Nonetheless, a person of ordinary skill in the art will readily appreciate the intent of this definition of noun phrase based on the discussion and labels provided herein. The automatic machine translation system, and the functionality employed by the system, may be called the Automatic Semi-Structured Entity Translation System ("ASSETS"). Isolated noun phrases may be found naturally in structured data sources, such as spreadsheets and databases, or the isolated noun phrases may be contained in semi-structured data produced through preprocesses, such as information extraction from full text or noun phrase chunking. While "columns" are discussed herein, the term extends to any set of grouped data including data obtained from semi-structured lists. Dividing sentences into non-overlapping phrases is called text chunking and noun phrase chunking deals with a part of this task that involves recognizing the chunks that consist of noun phrases.

The translation strategies employed by ASSETS may use category labels in one or more ways. Some include a lexicon-based lexical transfer mechanism that selects target language translations based on a preference for translations that are pre-associated with a semantic category in the system's lexicon. A lexicon of a language is its vocabulary, including words and expressions. An advanced translation strategy used by the ASSETS functionality in some embodiments employs category-specific shallow transfer rules to produce a graph of possible translations combined with statistical language models specific to each category to enhance translation sense selection and word ordering.

Some embodiments of ASSETS provide translation capabilities for data that is naturally structured by virtue of occurring in lists or in rows and columns, such as data that is found in spreadsheets or in tables of a database. ASSETS can also be used to process data that is semi-structured in the sense that the data originally occurred in full text, but was extracted and possibly categorized by information extraction technology. An example of category-specific knowledge enabling the selection of an appropriate translation strategy is for names of people, which normally should not be translated but instead either left alone, transliterated or translated using name-only translation senses. For example, the Russian name "Сергей Ложечко"should be transliterated as "Sergey Lozhechko" and not translated as "Sergey spoon", as mentioned above. Likewise, "Щедров Александр"should be transliterated as "Shedrov Aleksandr" or translated as "Shedrov Alexander" rather than translated as "Generous Alexander". Also included are category-appropriate translations of abbreviations such as "пр.", which expands to проспект(street) in addresses or to "проба"in medical terminology as in "тимоловая проба"(thymol test) or to "про́чее"(other) in "и пр." (etc.). Further, translation sense selection is affected by the semantic category of a noun phrase. For example, per the above, the Russian word "проспект"means "street" in the context of a list of addresses, but it means "brochure or prospectus" in the context of a list of document types.

FIG. 1 is a block diagram of an ASSETS server 100 that can implement an embodiment of the present invention. ASSETS server 100 includes a bus 105 or another communication mechanism for communicating information, and a processor 110 coupled to bus 105 for processing information. Processor 110 may be any type of general or specific purpose processor, including a central processing unit ("CPU") or application specific integrated circuit ("ASIC"). ASSETS server 100 further includes a memory 115 for storing information and instructions to be executed by processor 110. Memory 115 can include any combination of random access memory ("RAM"), read only memory ("ROM"), flash memory, cache, static storage such as a magnetic or optical disk, or any other types of computer readable media or combination thereof. Additionally, ASSETS server 100 includes a communication device 120, such as a network interface card, to provide access to a network. Therefore, a user may interface with ASSETS server 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, are further coupled to bus 105 to enable a user to interface with ASSETS server 100.

In one embodiment, memory 115 stores software modules that provide functionality when executed by processor 110. The modules include an operating system 140 that provides operating system functionality for ASSETS server 100. The modules further include ASSETS functionality 145 that is configured to perform structured data translation. ASSETS server 100 can be part of a larger system such as a cluster computing system, a distributed computing system, a cloud computing system, a "server farm" or any other system having multiple servers and/or computing devices. ASSETS server 100 will typically include one or more additional functional modules 150 to include additional functionality. In some embodiments, ASSETS functionality 145 may be part of operating system 140 or part of one or more other functional modules included in other functional modules 150.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write. The modules may also be stored on multiple media either residing on the same hardware device or distributed across multiple hardware devices.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
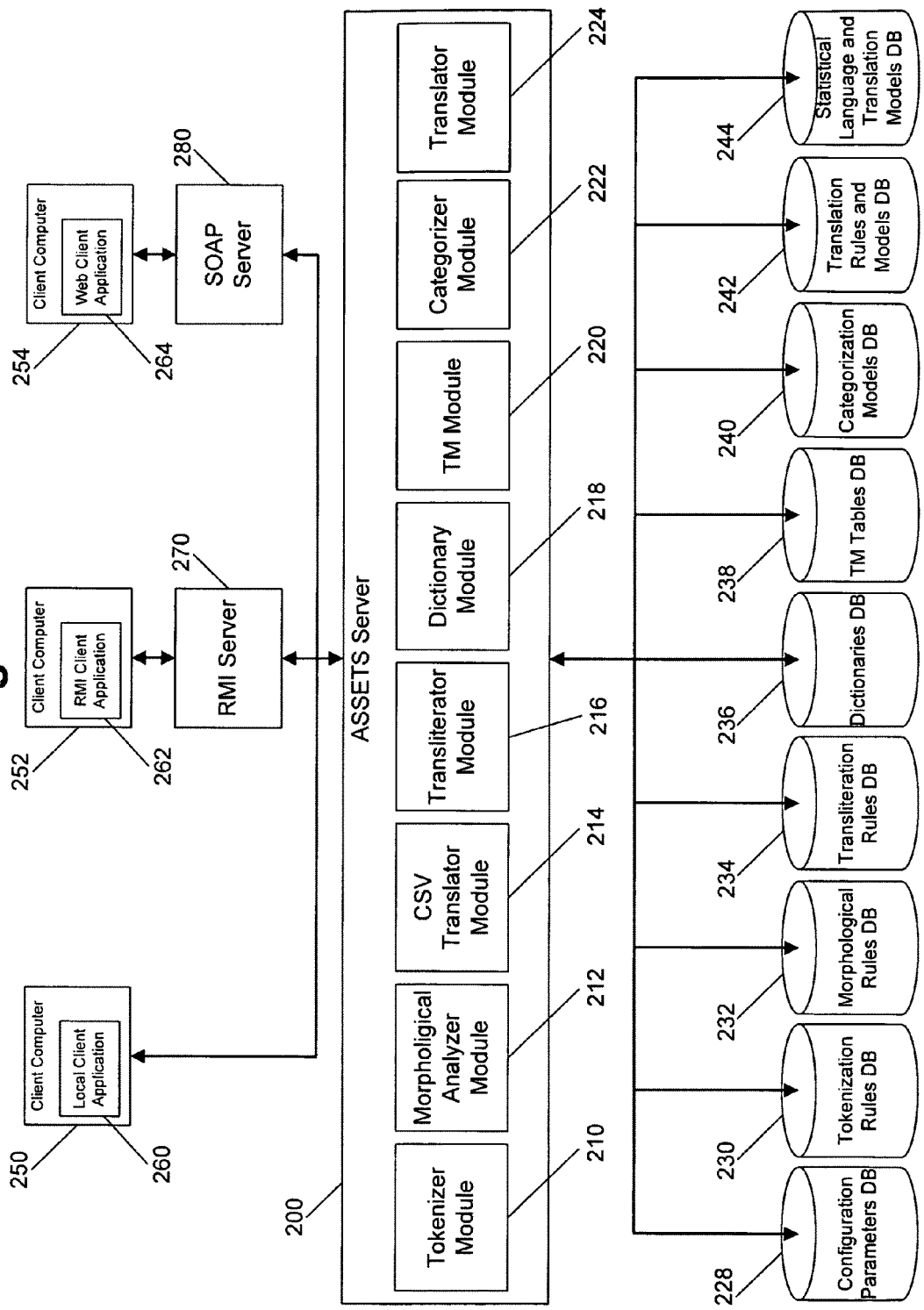
FIG. 2 is a block diagram illustrating a system implementing ASSETS, according to an embodiment of the present invention.

FIG. 2 is a block diagram illustrating a system implementing ASSETS according to an embodiment of the present invention. The system includes an ASSETS server 200 that has various functional modules. In some embodiments, ASSETS server 200 may be ASSETS server 100 of FIG. 1. Further, in some embodiments, the various functional modules may collectively perform ASSETS functionality 145 of FIG. 1.

The functional modules of ASSETS server 200 include a tokenizer module 210, a morphological analyzer module 212 (which may include or be replaced by a part of a speech tagging module), a Comma Separated Value ("CSV") translator module 214, a transliterator module 216, a dictionary module 218, a TM module 220, a categorizer module 222 and a translator module 224. Tokenizer module 210 divides a source language string into tokens when tokens are not provided to the system. Tokens represent word-like units that may be looked up in dictionary module 218 or translation memory module 220 and, thus, be associated with a set of grammatical and semantic features. Tokenizer module 210 generates information about the tokens it produces, including properties such as the data type and the capitalization.

Morphological analyzer module 212 may perform operations including lemmatization to find the citation form of each token along with dictionary and TM lookup by dictionary module 218 and TM module 220, respectively, to retrieve all information associated with the citation form, and to perform affix analysis for the purpose of determining grammatical characteristics marked by inflectional affixes. Lemmatization is the process of determining the "lemma" of a word. A lemma is the form of the word used as the headword or citation form in a dictionary, glossary, or index. For example, "hide" is the lemmatized form for "hides", "hiding" and "hidden". Lemmatization functionally allows the different inflected forms of a word to be grouped so they can be analyzed as a single item.

CSV translator module 214 parses comma separated data to retrieve the structured data stored therein. While shown here as a CSV translator, in some embodiments, one or more other characters may be used to separate data by CSV translator 214. In some embodiments, CSV translator 214 may be denoted as a "delimited data translator" since what the delimiter characters are and whether the file is actually a "physical" file are matters of design choice. For example, the data structure provided to ASSETS could be a "virtual" table resulting from a select statement from a database or from some other component that has read in data from an unknown spreadsheet format. Transliterator module 216 uses a specified transliteration standard to convert the writing system of a source language into that of a target language, and is used by various features to replace some or all of the source language string with target language characters. For example, in some embodiments, transliterator module 216 may be used to replace indicated portions of a TM entry with appropriate transliterations. Transliterator module 216 may also be used to replace unknown source language words with similar sounding representations in the target language, and/or to convert an entire source cell into a target language spelling. Dictionary module 218 contains associations of tokens with a set of grammatical and semantic features. TM module 220 contains lists of pre-identified translation pairs whose associations may be restricted by category. Categorizer module 222 may be configured to automatically identify the most likely category of a list of data. Translator module 224 uses the ASSETS category-driven isolated noun phrase translation feature to translate data cells from the source language to the target language.

Information for the functional modules of ASSETS server 200 may be retrieved from the various databases ("DB"s) depicted in FIG. 2. These databases may either be located in the same physical storage device or distributed across two or more storage devices. The entirety of a single database is not necessarily stored on a single storage device. In FIG. 2, tokenizer module 210 uses tokenization rules DB 230, morphological analyzer module 212 uses morphological rules DB 232, transliterator module 216 uses transliteration rules DB 234, dictionary module 218 uses dictionaries DB 236, TM module 220 uses TM tables DB 238, categorizer module 222 uses categorization models DB 240 and translator module 224 uses translation rules and models DB 242, respectively. Configuration parameters DB 228 contains shared parameters that may be used by all modules. Statistical language translation and models DB 244 may be used in performing noun phrase translation by a statistical engine or by a word sense selection feature that uses statistical knowledge, such as statistical engine 828 or category driven word sense selector 832, respectively, both illustrated in FIG. 8.

Various client applications may access the functionality of ASSETS server 200. A client computer 250 accesses ASSETS server 200 directly using a local client application 260. Another client computer 252 accesses ASSETS server 200 via a Java Remote Method Invocation ("RMI") client application 262 by way of RMI server 270. Yet another client computer 254 accesses ASSETS server 200 via a web client application 264 by way of Simple Object Access Protocol ("SOAP") server 280. While RMI and SOAP are discussed herein, other distributed and remote technologies may be used at the implementer's discretion.

The ASSETS system may be configured with various parameters allowing user control over the interpretation of the document, the behavior of categorizer module 222, transliterator module 216 and the translation features. The parameters available for controlling the system in some embodiments are listed in Table 1 below and explained in more detail in the sections pertaining to the affected component.

TABLE 1

ASSETS SYSTEM PARAMETERS

| Parameter | Data Type | Default | Explanation | Component(s) Affected |
|---|---|---|---|---|
| Categorize by Sample? | Boolean | False | Determine whether to select a subset of each column (list) to use in determining the category of a column | Categorizer Module |

TABLE 1-continued

ASSETS SYSTEM PARAMETERS

| Parameter | Data Type | Default | Explanation | Component(s) Affected |
|---|---|---|---|---|
| Sampling Strategy | Constant | FULL | {FULL, EVERY_Nth} | Categorizer Module |
| Use Column Headers for Categorization? | Boolean | True | Indicate whether an ontological classification of the column header should be included in the determination of a column's category | Categorizer Module |
| Verify Cell Categories? | Boolean | False | Indicate whether an individual cell's category should be rechecked and used for determining translation behavior | Translator Module |
| Apply TM to Sub-Cell Data | Boolean | True | Indicate whether entries in the translation memory should be applied to sub-cell tokens | Translator Module |
| Use Inexact TM Matching | Boolean | True | Indicate whether inexact matching should be used to retrieve items from the TM | TM Module |
| Inexact TM Matching Strategy | One from a list of schemes supported by the engine | System default per language | Select the inexact match strategy from a library of inexact matching algorithms | TM Module |
| Transliteration Scheme | One from a list of schemes supported by the engine | System default per language | Select the standard to be applied for transliteration | Transliterator Module |
| Encoding of Input Data | String | UTF-8 | Specify the character encoding of the document to be processed. This parameter is optional. The system includes components for automatically guessing a document's encoding. | Data Loader |
| List of Column Types | List of Enumerated Constants | Null | User-specified categories for each of the lists/columns to be translated by the system | Categorizer Module/Translator Module |
| List of Translation Strategies per Column | List of Enumerated Constants | System default per category | Each category is associated with a translation strategy by default. Users may override these defaults either in their user preferences or on a per-document basis. | Translator Module |
| Configuration File | Properties | System default for each property | Instead of setting each parameter value individually, users may pass in a configuration file containing parameter values for each document they process | Assets System Components (one or more of Data Loader, Categorizer Module, Transliterator Module and Translator Module) |
| Categorization Threshold | Number | .01 | Margin by which a column categorization must surpass the second best hypothesis to be returned as the column category | Categorizer Module |

Figure 3:
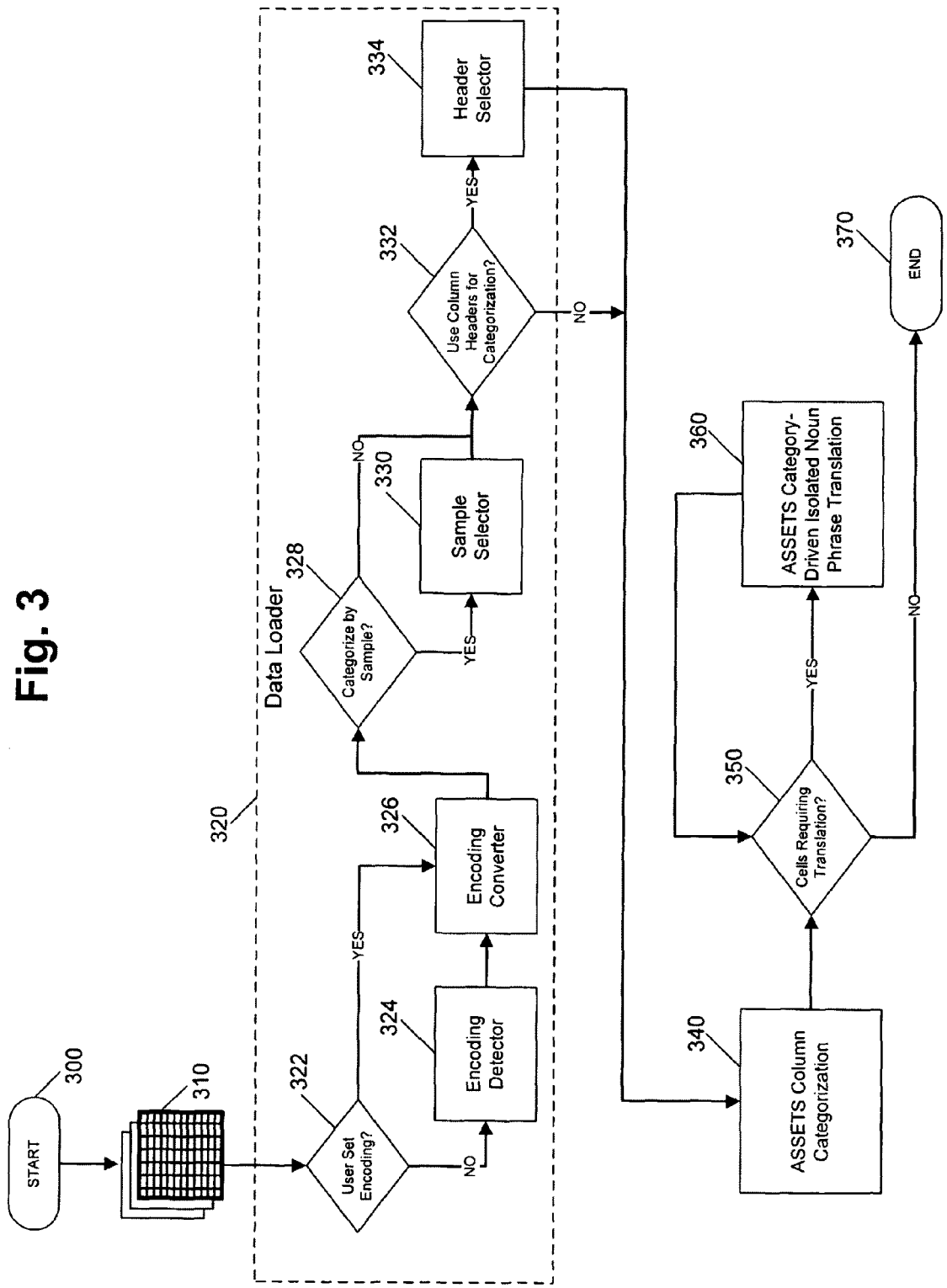
FIG. 3 is a flow diagram illustrating a high-level flow of the ASSETS system, according to an embodiment of the present invention.

FIG. 3 illustrates a high-level flow of the ASSETS system according to an embodiment of the present invention. In some embodiments, the functionality of FIG. 3 is implemented by software stored in memory or other computer readable media, and executed by a processor. In other embodiments, the functionality may be performed exclusively by hardware (e.g., through the use of an ASIC, a programmable gate array ("PGA"), a field programmable gate array ("FPGA"), etc.), or any combination of hardware and software. The process starts at 300 with ASSETS being initialized. Structured data 310 with columns of isolated noun phrases is provided to a data loader 320. Data loader 320 includes operations for ingesting data and for converting the ingested data to the internal representations used by the system. The ingested data may be either external or internal to ASSETS, such as a file on a disk or an in-memory data structure that is stored in cache memory or RAM. The first phase of data ingestion in this embodiment involves conversion to a certain encoding used by the system, such as Unicode, when input data is not provided in that encoding. Users may specify the encoding of the data or may allow an encoding detector 324 to automatically determine the input encoding in order to convert it to Unicode for internal system processing. If a user has set the encoding at 322, the structured data proceeds to an encoding converter 326 where the encoding is converted to the proper form, if necessary. If the user has not set the encoding at 322, the structured data is passed to encoding detector 324 to detect the encoding type and then onward to encoding converter 326 for conversion, if necessary.

Once the encoding has been handled, data loader 320 checks whether the document should be categorized by sample rather than using the entire document at 328. If the system is configured to categorize by sample rather than using the entire contents of a column, a sample selector 330 gathers a set of column samples for use by ASSETS column categorization 340. The option to categorize by sample rather than using the entire contents of a column is an efficiency measure that is designed to increase the speed with which a document can be loaded. Categorization by sampling may be performed, for instance, for large documents. The final task of data loader 320 is to determine whether column headers are to be used for categorization at 332. If yes, a header selector 334 isolates column headers to be factored into the column categorization. The process then proceeds to ASSETS column categorization 340.

After data loader 320 has loaded the data, ASSETS column categorization 340 identifies the category of each column to be translated. Users may specify some or all of the column categories, or may allow ASSETS column categorization 340 to automatically determine the most likely category of each column. Once the category of each column to be translated is identified, the individual cells along with the column category and any relevant parameter values are passed along by ASSETS. If cells require translation at 350, the data is passed to ASSETS category-driven isolated noun phrase translation 360 to translate data cells from the source language to the target language. Once cells no longer require translation, the process ends at 370.

Figure 4:
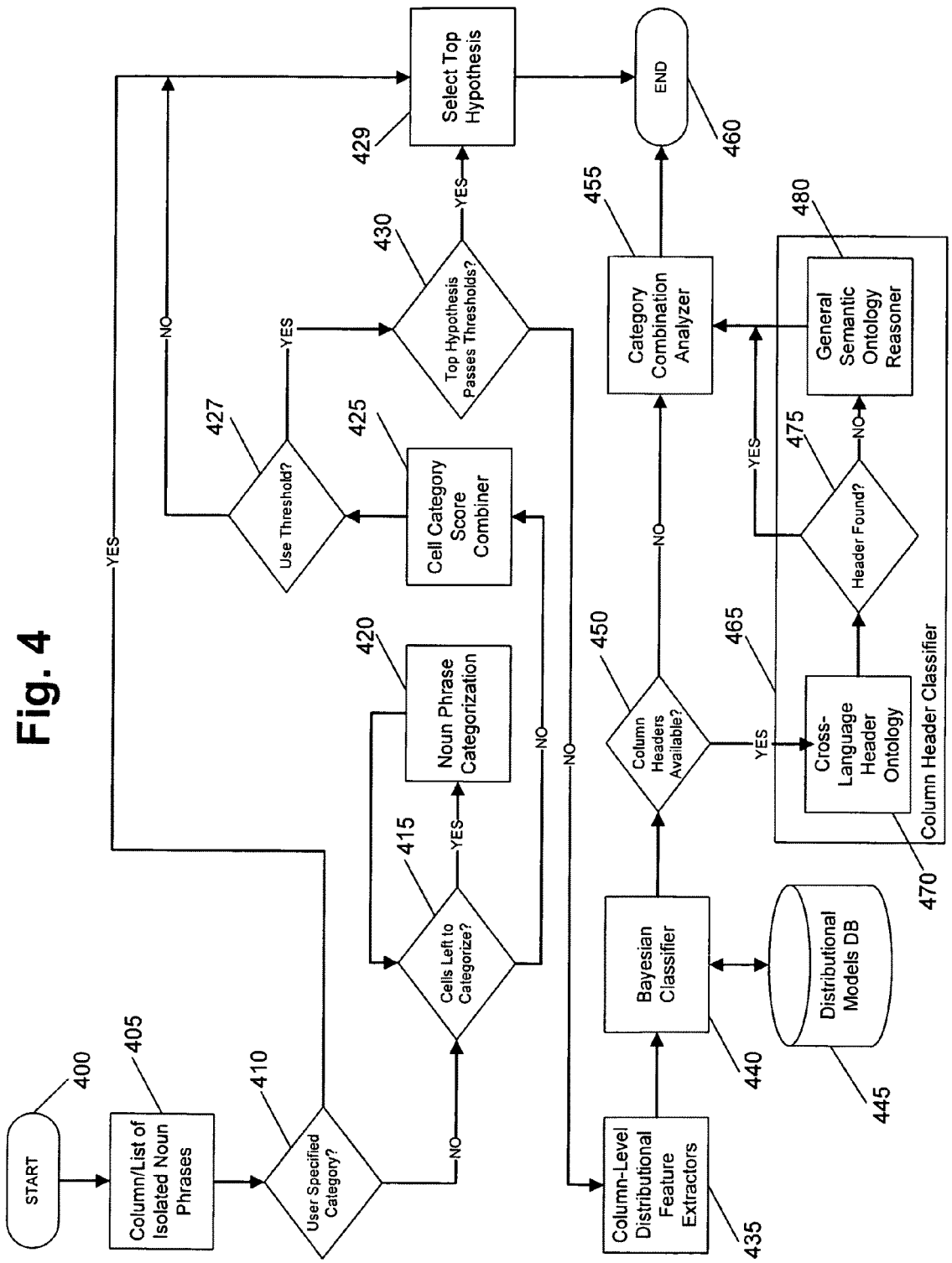
FIG. 4 is a flow diagram illustrating column categorization, according to an embodiment of the present invention.

FIG. 4 is a flow diagram illustrating column categorization, according to an embodiment of the present invention. In some embodiments, the column categorization of FIG. 4 may be implemented in ASSETS column categorization 340 of FIG. 3. Column categorization in the context of some embodiments of ASSETS is the ability to identify the semantic category of a list or column of data. Automatic column categorization fundamentally attempts to mimic the human ability to observe a column of data and label its contents. For example, a native speaker of a given language can easily identify a list of addresses or a list of people's names and distinguish those from a list of dates or a list of monetary values. The ASSETS column categorization approach in some embodiments combines knowledge-based and statistical techniques to achieve this functionality.

The process starts at 400 with a column or list of noun phrases 405 being provided. Per the above, one method of obtaining a column categorization is for a user who understands the source language to select a category for each column from among the column types available in the ASSETS category ontology. The precise contents of knowledge bases such as the category ontology, lexicons, transliteration, and translation rules may be subject to change and may differ by language. If a user has specified a category at 410, the category is known to the system and the process ends at 460.

However, if a user, such as a human using a GUI or a program that uses an Application Programming Interface ("API") to configure the system (either setting the category through the API parameters or configuring it to automatically detect the category), does not specify a category for a column of data, the system attempts to categorize the column automatically. While cells remain to be categorized at 415, ASSETS column categorizer 340 (illustrated in FIG. 3) creates a composite score for each category by combining results obtained for individual cells from Noun Phrase Categorization at 420. The score is created for a subset of the column's data if the system is configured to use column sampling, or from every cell in the column otherwise. ASSETS column categorizer 340 itself may use every cell provided to it to perform the categorization. Once there are no cells remaining to categorize at 415, cell category score combiner 425 combines the scores. If the system is not set to use a threshold at 427, where the top ranking score for a column should exceed the second highest score by a margin defined either through system default values or specified by the user, the system proceeds to select the top hypothesis at 429. If the system is set to use a threshold at 427 and the top ranking score passes this threshold at 430, the associated category is selected as the column category based on the top hypothesis at 429 and the process ends at 460.

If the threshold is not passed at 430, additional features of the column are considered in the reclassification. Column-level distributional feature extractors are employed to extract distributional features pertaining to the whole column at 435 and are incorporated into the classification results. In another embodiment, the column level features and the header features are incorporated in the same Bayesian model as the cell level features, which may be toggled on or off by configuration parameters. Distributional features may include observable statistics such as the number of unique cell values in the column, the number of unique tokens in the column, the frequency curve of the tokens in the column, and the like. After passing through column-level distributional feature extractors at 435, the data passes through a Bayesian classifier 440 that is trained to associate feature values with categories defined in the ASSETS category ontology. Bayesian classifier 440 uses distributional models stored in distributional models DB 445.

If no column headers are available, the process proceeds to category combination analyzer 455. If the system or a user has made column headers available at 450, the column headers are passed to column header classifier 465 and considered. The column headers are passed to a cross language header ontology component 470 that is configured to classify column headers according to the ASSETS cross-language header ontology. The header ontology in some embodiments is a two level classification system associating header strings with category labels. Strings of any language may be listed under any given category. If a header is not found within the header ontology, an attempt may be made to use a general English semantic ontology to locate the header classification. This is accomplished via the translation senses of each source token.

If a header is found at 475 using the header ontology at 470, the process proceeds to category combination analyzer 455. If not, the process proceeds to a general semantic ontology reasoner 480 that is configured with a parameter that determines the direction in which the tokens should be examined, i.e. left-to-right or right-to-left. This setting should generally be derived from the headedness of noun phrases in the source language. In other words, if the source language reads from left-to-right and is a head-first language, the tokens should be scanned from left-to-right. If the source language reads from left-to-right and the source language is a head-last language, the tokens are likely to be scanned from right-to-left. Languages that are read from right-to-left are also accommodated by this approach. This parameter allows languages with different characteristics to be effectively handled by the header classification component.

For each token, translation senses are looked up one-by-one in the general semantic ontology for the target language. The ontology is queried for synonyms of the translation sense under consideration. Each synonym obtained in this way is then looked up in the ASSETS cross-language header ontology. If a synonym is found, its associated category is returned and the process proceeds to category combination analyzer 455. If no synonym is found, the next token is examined. The first token found using this cross-language reverse-lookup technique may be used to determine the category of the header. If no synonyms are found, the ontology is queried to obtain hypernyms of the source token's translation senses, which are then looked up in the header ontology. A hypernym is a word that is more generic than the source word. This process continues until a header category is selected or until the maximum node traversal limit is reached or all tokens in the cell have been examined. The maximum node traversal limit may be another parameter of general semantic ontology reasoner 480. Once the process has proceeded to category combination analyzer 455, this component uses the data available from the previous components, including one or more of cell category score combiner 425, Bayesian classifier 440 and column header classifier 465. Category combination analyzer 455 then makes a determination as to the category that should be used.

In some embodiments, category combination analyzer 455 uses various techniques for producing the final decision about the category rankings. A decision tree is used to determine which technique is employed. If headers are not used, then the results produced by noun phrase categorization 425 and Bayesian classifier 440 are combined mathematically to re-rank the categories. If headers are available, the decision tree determines whether header classifications are configured to override statistical classifications for direct matches in the header ontology. If so, the header category is used directly. If not, the header category produced by column header classifier 465 is used to decide among the top choices when the category matches one of the top N categories, where N is an integer and inclusion in the top N categories is determined by being within the threshold relative to the top hypothesis.

Some embodiments of the ASSETS noun phrase categorization, like other ASSETS operations, are language-independent but configurable for specific languages using parameter settings and externally defined knowledge sources. The noun phrase categorization may use feature extraction and machine learning based on Bayesian statistics to automatically determine the category of a single cell or isolated noun phrase. A Bayesian classifier (such as Bayesian classifier 535 of FIG. 5) may be trained to associate feature values with categories defined in the ASSETS category ontology. The types of features used for categorization may include data type characteristics, morpho-syntactic information, semantic categories and features, local distributional statistics and pattern-based features. The specific set of features used may vary according to the parameter settings for the language being processed. Each language may be configured to use a different subset of the ASSETS category ontology and possibly a different subset of the ASSETS feature extractors.

Feature extractors are specialized components that look for specific characteristics of the entire noun phrase string or of individual tokens of the string. Each feature extractor is designed to identify a specific type of characteristic. For example, one feature extractor may be specialized to examine the parts-of-speech of the NP's tokens, another to calculate the ratio of numbers to characters, another to examine the semantic category labels associated with each token, and another to look for externally defined pattern matches. The ASSETS noun phrase categorization (such as noun phrase categorization 420 of FIG. 4 and the process for noun phrase categorization illustrated in FIG. 5) introduces the notion of feature extraction strategies. Each feature extractor uses one strategy selected from a library of feature extraction strategies along with a set of language-specific knowledge base resources, such as lexica and pattern descriptions. Some feature extraction strategies that may be used for NP categorization are described in Table 2 below.

TABLE 2

| FEATURE EXTRACTION STRATEGIES | | |
|---|---|---|
| Feature extraction strategy | Description | Example |
| Distributional, tokens | Calculate the proportion of tokens containing a specific attribute or attribute value relative to the total number of tokens | The number of numeric tokens compared to the total number of tokens |
| Distributional, string | Calculate the proportion of characters in a string that meet a specific criterion | The number of "digits" or "numeric characters" compared to the total number of characters |
| Property-based, tokens | Check for the existence of one or more tokens that have a certain property. Properties can be part-of-speech labels, semantic features or category labels, token type labels, etc. | Do any of the tokens have the OrgTerm property? |

TABLE 2-continued

FEATURE EXTRACTION STRATEGIES

| Feature extraction strategy | Description | Example |
|---|---|---|
| Pattern-based, string | Determine whether the source string matches a regular expression | .*?\@.*(COM\|EDU\|ORG) |
| Pattern-based, tokens | Determine whether one of the tokens from the source string matches a regular expression | .*?BERG\s |
| Mixed Pattern and Property | Find a regular expression for which one of the match groups passes a property-based test | [0-9] + \s{StreetTerm\|StreetAbbreviation} |

The ASSETS noun phrase categorization may consist of a training phase and a run-time classification phase. During the training phase, the system is taught to associate each category in the ASSETS category ontology with values produced by a group of feature extractors. Training is accomplished by running feature extractors on labeled training data (i.e., data for which the category is known). The feature extractors produce discrete/continuous and real/enumerated values representing different types of extraction results, and a Bayesian statistical model is produced that records the strengths of association of each feature value with each category. At run-time, in order to classify unknown data, the same set of features is extracted. The association strengths for each feature value are retrieved from the model and computed to produce, for each category, a probability score representing the likelihood that the data belongs to the category. This process flow is illustrated in FIG. 5.

Figure 5:
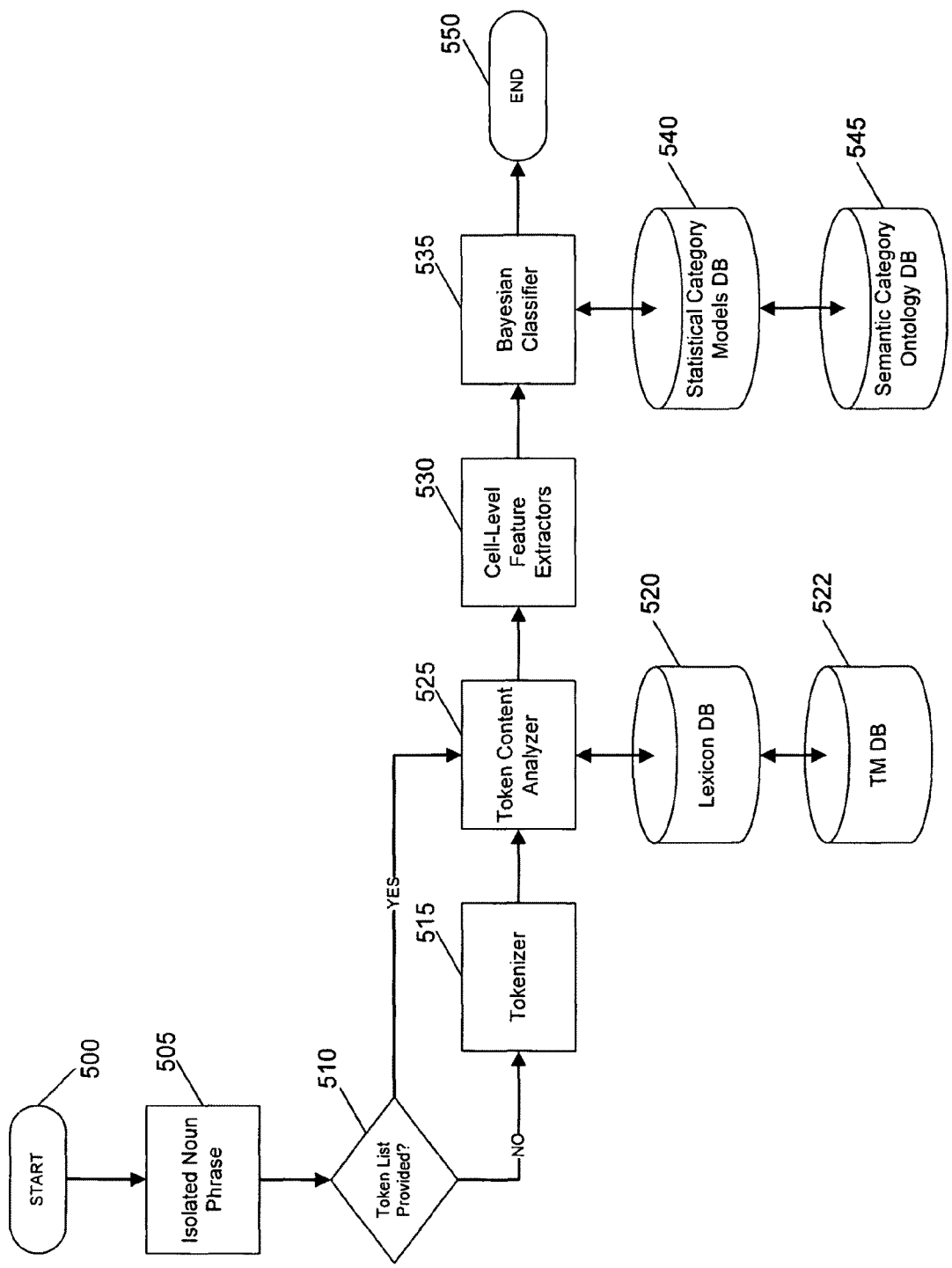
FIG. 5 is a flow diagram illustrating noun phrase categorization, according to an embodiment of the present invention.

FIG. 5 is a flow diagram illustrating noun phrase categorization, according to an embodiment of the present invention. In some embodiments, the noun phrase categorization of FIG. 5 may be implemented in noun phrase categorization 420 of FIG. 4. The process starts at 500 with a column or list of isolated noun phrases 505 being provided. The process then determines whether a token list has been provided at 510. If so, the process proceeds to token content analyzer 525. If no token list is provided, tokenizer 515 divides source language strings into tokens. Tokenizer 515 generates information about the tokens it produces, including properties such as the data type and the capitalization.

The process then proceeds to token content analyzer 525. This component associates each token with all known attributes contained in lexicon DB 520 or TM DB 522. While the DBs are shown as connected to one another and data from TM DB 522 would be "passed through" lexicon DB 520 in FIG. 5, one of ordinary skill in the art would readily understand that the databases may be connected in any fashion and data from one DB need not pass through another to reach a certain module. This is also the case with the other DBs illustrated in the figures. In order to retrieve information from lexicon DB 520 or TM DB 522, token content analyzer 525 inspects each token to determine whether it needs to be submitted to a morphological analysis routine and performs the analysis if it does. The behavior of this component may be controlled through configuration options specified by system developers during the creation of a knowledge base for a new source language. The configuration options allow certain token types to be excluded from morphological analysis and/ or from translation in general. For example, tokens with the types "NUMERIC", "URL" or "EMAIL" do not need to be looked up in a dictionary or further analyzed. This behavior is configured for each language pair's knowledge base because the tokenization rules, and therefore token types, are subject to change from language to language.

Tokens whose types are not explicitly excluded are subject to morphological analysis. Morpholgical analysis in the ASSETS system includes lemmatization to find the citation form of each token along with dictionary and TM lookup to retrieve all information associated with the citation form, and affix analysis for the purpose of determining grammatical characteristics marked by inflectional affixes. Any required disambiguation of translation senses is performed in subsequent stages of the ASSETS system.

The complication involved in looking up words in electronic dictionaries may be the same that a human being encounters when looking up words in a paper dictionary: namely, finding the appropriate headword or citation form for the word being looked up. For example, one does not search for the word "boys" in an English dictionary, but rather "boy" because the latter is the uninflected, singular form of the noun which, by English lexicographic standards, is the citation form for nouns. Finding the citation form of words for the purpose of looking them up in the dictionary involves determining whether the word is already a citation form or whether it has affixes attached to it. For the word "boys", for example, the citation form is found by removing the plural suffix "s". Morphological analysis is challenging for numerous reasons. Often, rules that guide the formation and decomposition of word forms have exceptions. For example, in English, a simple rule for finding the citation form based on a plural surface form might be to remove the letter "s", so that "boys" becomes "boy" and "cats" becomes "cat". This rule would over-apply to words ending in "s" such as "his" which would erroneously become "hi", and would under-apply on surface forms ending in "es" such as "crutches". Further, the rule would not apply at all to irregular plurals such as "children". These examples are provided to illustrate the concept of morphological analysis, which is challenging even for languages with relatively limited morphological paradigms such as English.

In some embodiments of ASSETS, each language configuration may use one of three possible strategies for relating surface forms of words to their citation form. The first is a morphological dictionary, which is simply a file that lists all known surface forms, their citation forms, and the features indicated by any attached affixes, including prefixes, suffixes, infixes, circumfixes and any other category of bound morpheme. The second is run-time morphological analysis, which attempts to decompose words into citation forms plus affixes using rules, statistics, or other mechanisms. The third is stemming, which is an imperfect but fast technique that may be used in information retrieval systems for removing endings, leaving a stem that may or may not correspond to a real word, but that can be used to quickly flatten distinctions among words and to find the associated entry in an index. The first two strategies may be the techniques used for locating terminology in some embodiments of the ASSETS TM and lexicons since they allow for the identification and use of grammatical information carried on affixes for the purposes of more accurate translation. Token content analyzer 525 uses lexicon DB 520 for looking up terms in the lexicons.

The process then proceeds to cell-level feature extractors 530. Per the above, each feature extractor is designed to identify a specific type of characteristic and in some embodiments, may include one or more of those listed in Table 2. Next, Bayesian classifier 535 is trained to associate feature values with categories defined in the ASSETS category ontology using features such as data type characteristics, morpho-syntactic information, semantic categories, local distributional statistics and pattern-based features. Bayesian classifier 535 uses statistical category models from statistical category models DB 540 and a semantic category ontology from semantic category ontology DB 545. Following application of the Bayesian classifier, the process ends at 550.

A purpose of the ASSETS category-driven noun phrase translation feature may be to define a set of processes where isolated noun phrases, such as of the type encountered in structured data, can be converted from one human language (the source language) into another human language (the target language). The feature may rely heavily upon the identification of a category and the association of that category with a translation strategy. The overall approach of the translation in some embodiments is to delay deep linguistic analysis until all other options have been exhausted, meaning that the feature may rely heavily upon the existence of a densely populated translation memory and system dictionary that may be supplemented by user-created translation memories and dictionaries. If items are not found in one of these resources, then the ASSETS hybrid category-driven isolated noun phrase transfer feature may be used. The noun phrase transfer feature may offer a set of translation strategies, along with default associations between those strategies and the categories of the ASSETS category ontology. Users may override those defaults either by explicitly specifying which strategy to use for a list or column of data or by changing the strategy assigned to a particular category. All of the major components of the system employ category labels to perform their role. The high-level flow of the translation feature according to some embodiments is depicted in FIG. 6.

Figure 6:
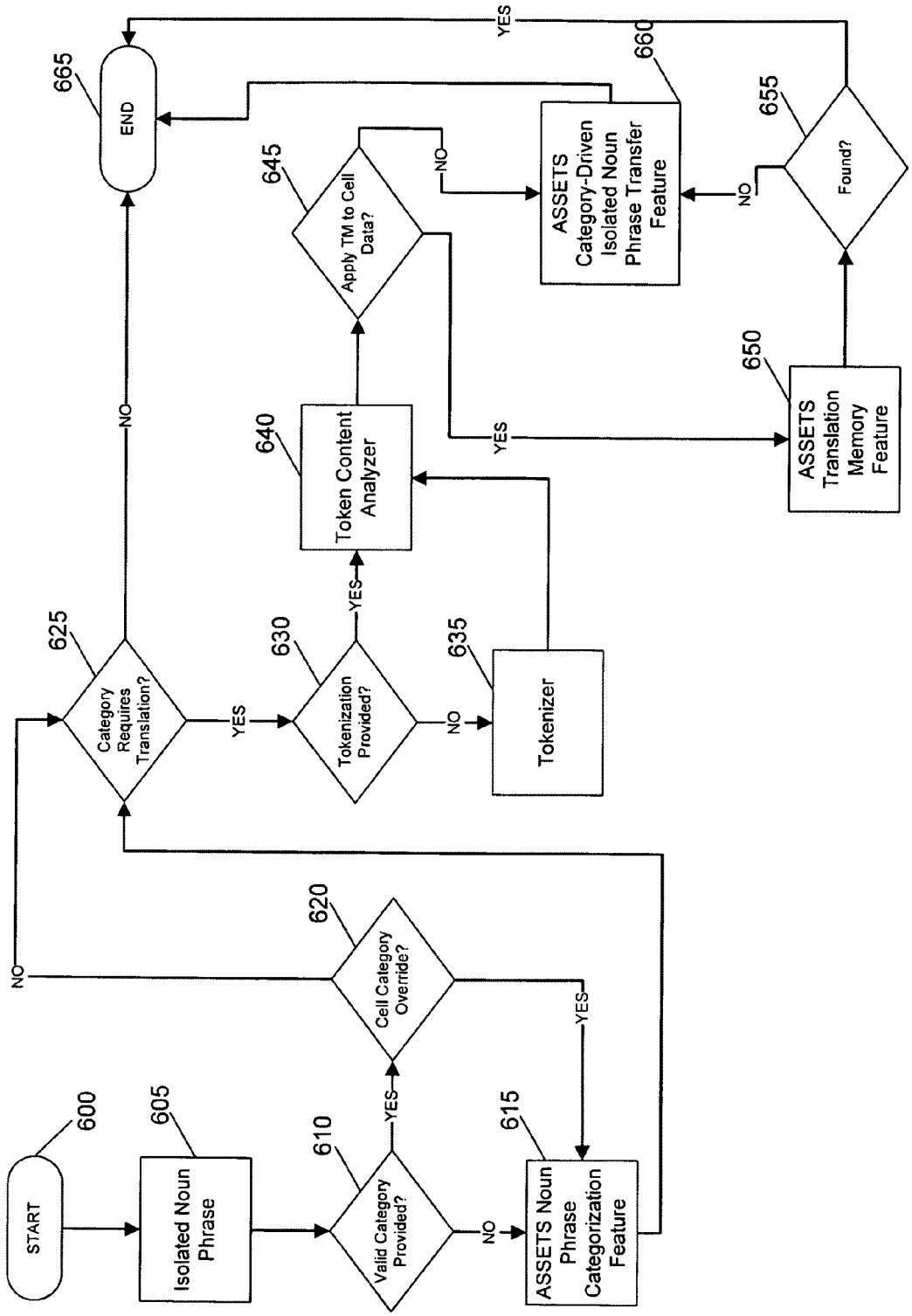
FIG. 6 is a flow diagram illustrating category-driven isolated noun phrase translation, according to an embodiment of the present invention.

FIG. 6 is a flow diagram illustrating category-driven isolated noun phrase translation according to an embodiment of the present invention. In some embodiments, the category-driven isolated noun phrase translation of FIG. 6 may be implemented in category-driven isolated noun phrase translation 360 of FIG. 3. The process starts at 600 with an isolated noun phrase 605 being provided.

In translation of a data cell, the category of the cell or isolated noun phrase is ascertained. In this application, the terms "cell" and "isolated noun phrase" are used interchangeably. If the process is provided with a valid category at 610, no categorization is performed unless the categorization provided to the system is overridden at 620. In the case that the categorization is overridden, the cell would be re-categorized using the ASSETS noun phrase categorization feature at 615. Once a valid category is established at 615, if the category does not require translation at 625, no further processing is required and the process terminates at 665. If the category does require translation at 625, if tokens are not already available at 630, the cell data is tokenized by tokenizer 635. As discussed above, the role of an ASSETS tokenizer, such as tokenizer 635, may be to divide the source language string into tokens if tokens are not provided to the system. Tokens represent word-like units that may be looked up in the system's dictionary or TM and thus be associated with a set of grammatical and semantic features. Tokenizer 635 generates information about the tokens it produces, including such properties as the data type and the capitalization. Tokens are then passed through token content analyzer 640 to retrieve associated TM and lexicon-based syntactic and semantic properties, as discussed above. These properties may be used by components throughout the remainder of the translation. If the system is configured to use translation memory at the cell data level at 645, ASSETS translation memory 650 is applied to cell data. If ASSETS translation memory 650 returns a translation, no further processing is required and the process ends at 665. If the cell data is not handled by the translation memory component, then it is passed to ASSETS category-driven isolated noun phrase transfer feature 660, which is discussed in further detail with respect to FIG. 8 below.

Translation memory may be a standard component of some machine translation systems. However, some embodiments of ASSETS translation memory are "transliteration-enabled". This means that although the translation memory contains a list of fixed translation pairs, sub-portions of the entries may be marked as "transliteratable". Any portions of the source string marked as transliteratable will change form in the translated output based on the rules of the selected transliteration scheme, unless the use of transliteration by the TM is globally disabled. For example, the Russian TM entry for noun phrase "ЗАО ТелекоммуникационнаяКомпания [ИНТЕЛКОМ]" may be listed in the TM as [IntelCom] Telecommunications Company, JSC. If the TM is configured to use transliteration, the bracketed portions in this example would be replaced with a different string if the transliteration standard used different letter-to-letter mappings. For example, in many standards "IntelCom" would be spelled "IntelKom" and the string returned would be "IntelKom Telecommunications Company, JSC".

Figure 7:
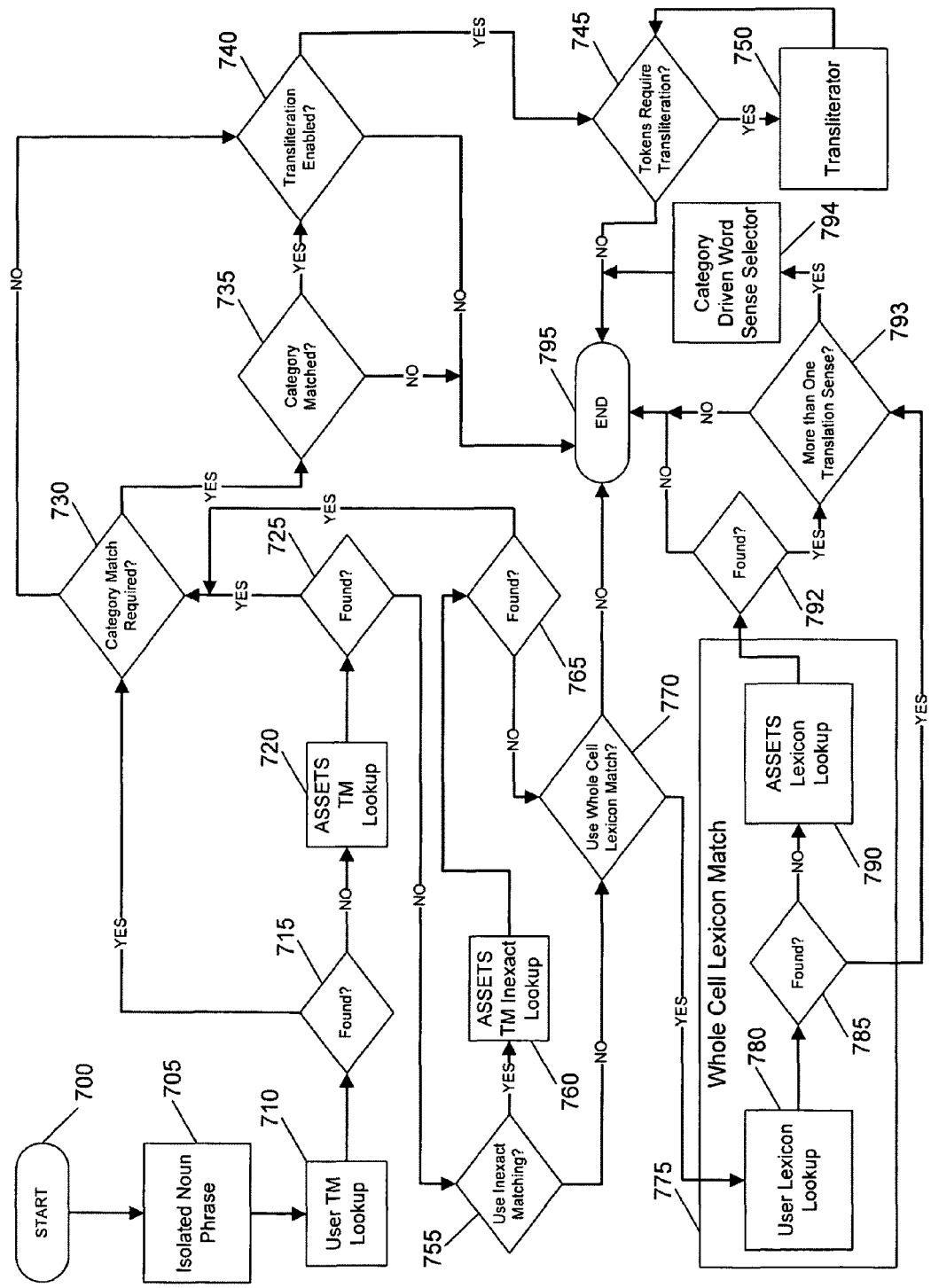
FIG. 7 is a flow diagram illustrating transliteration-enabled translation memory ("TM"), according to an embodiment of the present invention.

FIG. 7 is a flow diagram illustrating transliteration-enabled translation memory, according to an embodiment of the present invention. The process starts at 700 with an isolated noun phrase 705 being provided. The system then determines whether a phrase is listed in the user's TM repository at 710. If the phrase is not found there at 715, ASSETS TM lookup is performed at 720 and the system repository is checked. If the system is configured to use inexact matching at 755, and the phrase is not found at 725, then a second attempt is made to find the source data at 760 using one of the inexact TM matching strategies listed in Table 3 below, first against the user TM and then against the system TM. If the term is not found in either TM at 765, and the system is not configured to check whole cells against the lexicon at 770, the process finishes by returning no results at 795. If the system is configured to use whole cell lexicon matching at 770, then the system looks to see if the entire string contained in a cell is to be found in the user or system lexicon using whole lexicon cell match 775.

First, user lexicon lookup 780 is performed to determine whether the whole cell, i.e. the entire NP string, is found in the lexicon. If a match is found at 785, and only one translation sense is available at 793, the process ends at 795. If more than one translation sense is available at 793, the process proceeds to category driven word sense selector 794. If the whole cell is not found in the lexicon at 785, ASSETS TM lookup is performed at 790. If the whole cell is not found, the process ends at 795. If the whole cell is found, the process proceeds to the more than one translation sense decision point 793 and continues as discussed above. If a whole cell match is found, and a category-specific translation sense is available, that sense is returned. If not, the default general sense is returned. Returning to the "category match required" decision point at 730 that is reached when an entry is found in either the user TM lookup 710, proceeding to the "yes" branch of decision point 715, or the ASSETS TM lookup 720, proceeding to the "yes" branch of decision point 725, if the process requires a category match at 730 then the category parameter is checked against the types listed for the entry in the TM. If the types do not match at 735, the process finishes by returning no results. If they do match at 735, or if no match is required at 730, the next step is to determine whether transliteration is to be applied. If the translation memory feature is configured to not use transliteration at 740, then the target language string is returned literally, as-is, from the TM and the process ends at 795. Conversely, if the TM feature is configured to use transliteration at 740, the TM entry is checked for annotations indicating which portions of the entry need to be transliterated at 745 and each portion, if any, is passed to transliterator 750 in turn. Transliterator 750 uses the specified transliteration standard to replace the indicated portions of the TM entry with the appropriate transliterations, and the process finishes by returning the translation.

TABLE 3

TRANSLATION MEMORY MATCH STRATEGIES

| TM match strategy | Description | Return Type | Example |
|---|---|---|---|
| Strict match, surface strings | All words must be present and in the same order, with the exact form (inflection, declension) and spelling of each string | Boolean | "Sport and Game Association" will only match itself, it will not match variations such as "Sports and Game Association" nor "Association of Sports and Games". |
| Strict match, stems | All words must be present and in the same order, but the match is made against stemmed forms of each token | Boolean | "Sport and Game Association" will match "Sports and Game Association" |
| Ignore function words, use surface forms, ordering optional | Match without consideration for the existence of function words, such as prepositions, articles, demonstratives, etc. Which function words to ignore is defined on a per-language basis in external configuration files. The remaining tokens must match but regardless of order. The ranking is produced as a function of the longest substring matches on surface forms of tokens | Ranked list | "The Chamber of Commerce of the Upstate New York Region" and "The Upstate New York Region Chamber of Commerce" will match with this strategy |

TABLE 3-continued

TRANSLATION MEMORY MATCH STRATEGIES

| TM match strategy | Description | Return Type | Example |
|---|---|---|---|
| Ignore function words, use stemmed forms, ordering optional | Match without consideration for the existence of function words, such as prepositions, articles, demonstratives, etc. Which function words to ignore is defined on a per-language basis in external configuration files. See FIG. 2, reference numerals 228-244. The remaining tokens must match but regardless of order. The ranking is produced as a function of the longest substring matches on stemmed forms of tokens | Ranked list | All of the following will match: "The Chamber of Commerce of the Upstate New York Region" "The Upstate New York Region Chamber of Commerce" "The Upstate New York Regional Chamber of Commerce" "The Regional Upstate New York Chambers of Commerce" |

The ASSETS hybrid category-driven isolated noun phrase transfer feature is a highly configurable translation component that provides flexibility by giving users the option of specifying a translation strategy to be used in some embodiments. The strategies range in complexity from a simple, transliteration-only strategy to a more complex shallow syntactic transfer strategy with category focused statistical translation sense selection. Some of the ASSETS translation strategies for some embodiments are listed below in Table 4.

TABLE 4

ASSETS TRANSLATION STRATEGIES

| Translation Strategy | Description |
|---|---|
| transliteration only, no TM | All data is transliterated according to the selected transliteration scheme regardless of whether it exists in the TM. Appropriate for data such as person names when users want purely rule-based transliterations. |
| transliteration only, with TM | All data is to be transliterated according to the selected transliteration scheme, but if found in the TM, the TM-based translation will be used instead of the transliteration. This applies to whole cell TM matches only. Appropriate for data such as person names when users want rule-based transliterations only when TM data is not available. |
| third party translation | This offers users the possibility of using an external translator to process cells after the cells have been run through the categorizer and the TM. This strategy is appropriate for cells containing data that is not primarily isolated noun phrases. |
| key word replacement plus transliteration | This is a simple translation strategy in which category-specific key words are translated, and all other terms are transliterated. No word reordering is used. This strategy is appropriate for categories such as "street address". |
| category-driven lexical transfer | This strategy uses a simple technique sometimes referred to as "gisting", in which each source word is replaced in situ by a translation sense acquired from a lexicon. In the ASSETS lexical transfer strategy, category-specific translation senses are preferred over non-category specific senses. When more than one category-specific translation sense is available, the most appropriate sense is chosen using a target-language only category-specific language model. |

TABLE 4-continued

ASSETS TRANSLATION STRATEGIES

| Translation Strategy | Description |
| --- | --- |
| category-driven shallow syntactic transfer | This strategy uses a rule based-approach to syntactic transfer combined with a target-language only category-specific language model for translation sense selection. Syntactic transfer rules specify how to change the order of tokens to match the word order of the target language, generating graphs of possible translations. Category specific rule sets are applied and category-specific translation senses are preferred. When more than one category-specific translation sense is available, the most appropriate sense is chosen using a target-language only category-specific language model. |
| statistical model translation | Use category-specific statistical models for purely statistical translations. |

Figure 8:
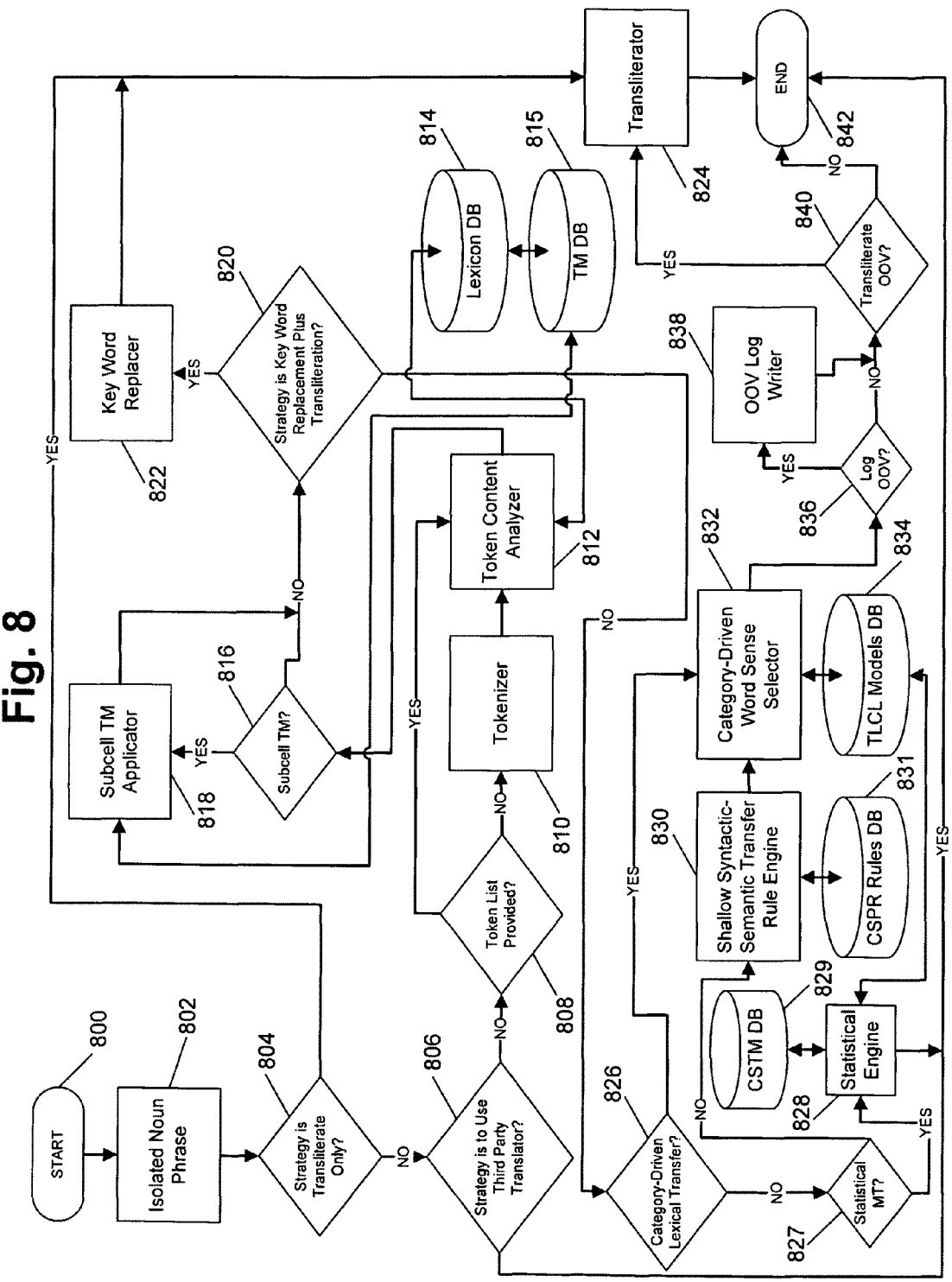
FIG. 8 is a flow diagram illustrating ASSETS hybrid category-driven isolated noun phrase transfer, according to an embodiment of the present invention.

The translation strategy works in conjunction with other parameters to control processing steps taken by the noun phrase transfer feature, as illustrated in FIG. 8. FIG. 8 is a flow diagram illustrating ASSETS hybrid category-driven isolated noun phrase transfer according to an embodiment of the present invention. The process starts at 800 with an isolated noun phrase 802 being provided. Two of the translation strategies are essentially "short circuit paths". If the translation strategy involves transliteration only at 804, the data is passed to transliterator 824 whose results are returned as the isolated noun phrase translation and the process then ends at 842. If the translation strategy is to use a third party component at 806, the cell data will be passed off to that component and its results returned as the translation, ending the process at 842.

If neither of the "short circuit paths" is chosen, if a token list is not provided at 808, the cell data is tokenized at 810. Token content is then analyzed by token content analyzer 812, which makes use of lexicon DB 814 and TM DB 815. Translation memory is applied at the sub-cell level by subcell TM applicator 818 if this parameter is toggled on at 816. Subcell TM applicator 818 also has access to TM DB 815. Any remaining tokens are translated according to one of four remaining translation strategies: key word replacement plus transliteration, category-driven lexical transfer, shallow syntactic transfer and statistical model translation. If the translation strategy is key word replacement plus transliteration at 820, then any key words in the un-translated portion of the string are translated using the category-appropriate translation sense or the default sense if a category-specific sense is not available in the lexicon by key word replacer 822. The semantic features that mark a token as a key word may be specified on a per-category basis. Once this is accomplished, the remaining tokens are passed to transliterator 824 and the combined results are returned as the isolated noun phrase translation, ending the process at 842.

If the strategy is not key word replacement plus transliteration at 820, three strategies remain. The first is the category-driven lexical transfer strategy at 826. This is performed by category-driven word sense selector 832, which makes use of Target Language-only Category-specific Language ("TLCL") Models DB 834. Under this strategy, source words are translated in situ by replacing each source token with a category-specific translation sense. If more than one category-specific sense is available, a target language only category-specific language model is consulted to select the translation sense. If no category-specific sense is available, the default sense is used.

If category-driven lexical transfer is not selected at 826, the system determines whether statistical model translation is to be used at 827. If yes, then statistical engine 828 is employed. Statistical engine 828 uses category-specific statistical models for purely statistical translations, making use of category-specific translation models DB 829 and TLCL models DB 834. After statistical engine 828, the process ends at 842.

Finally, if none of the previously described translation strategies is used, the default behavior is to perform shallow syntactic transfer first using shallow syntactic semantic transfer rule engine 830, which makes use of category-specific phase reordering rules ("CSPR") DB 831. In this approach, category-specific rules are applied to the input. These rules describe word-order transformations necessary to achieve optimal target-language word ordering. The application of these rules, which may apply to overlapping spans of text, produces a translation graph. A translation graph is a compact way to represent alternative translations that would be produced by the application of different rules and the selection of different word senses. Then, the best path through the translation graph is chosen. This is accomplished using a similar translation-sense selection as described for the category-driven lexical transfer strategy, but with the addition of statistical n-gram models used to prefer paths through the graph that optimize the presence of high frequency n-grams in the target language. Namely, category-specific translation senses are preferred. If more than one category-specific translation sense exists, a target language only category-specific language model is consulted to select the translation sense. If no category-specific sense is available, the default sense is used. The result of this translation strategy should be a well-formed phrase representing the meaning of the source phrase via the syntax and vocabulary of the target language.

In some cases, input provided to ASSETS will contain words or tokens that are not recognized by the system as part of the source language's vocabulary. Unknown words are referred to as being "out of vocabulary" ("OOV"). Tokens are out of vocabulary if they are not found in the dictionary or TM, or recognized as a data type that is not required to be analyzed, such as numbers, email addresses and alphanumeric data types. The handling of OOV items is determined by configuration parameters. OOV items may be left as-is in situ in the original script of the language or transliterated according to the selected transliteration scheme. OOV items may also be flagged, meaning that they will be highlighted using some markup such as bold font, brackets, or some other technique. In order to allow ASSETS users or developers to enhance the system by inspecting and handling OOV terms if OOV items are to be logged at 836, a log writer 838 is provided that may record OOV terms and certain data about their context that will allow the OOV terms to be incorporated into the lexicon, TM or rule base or statistical models in subsequent instantiations of the ASSETS system. If OOV items are to be transliterated at 840, the process proceeds to transliterator 824. Thereafter, the process ends at 842.

Figure 9:
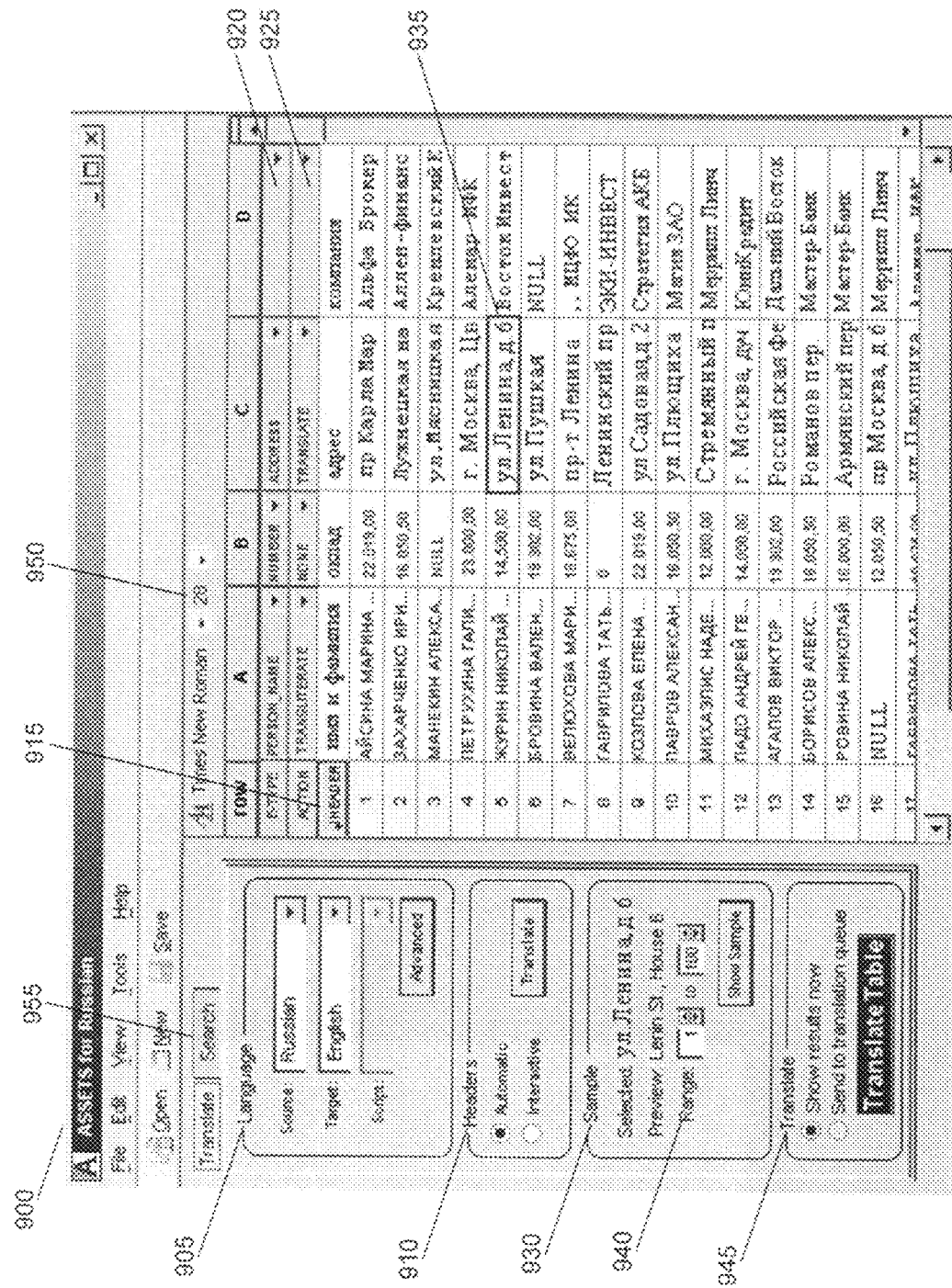
FIG. 9 is a screenshot diagram illustrating a graphical user interface ("GUI") for ASSETS, according to an embodiment of the present invention.

FIG. 9 is a screenshot diagram illustrating a GUI 900 for ASSETS, according to an embodiment of the present invention. Although many alternative designs are possible, this illustration is provided in order to assist with visualization of a potential graphical implementation of an ASSETS front-end client application. Table 5 provides descriptions of various features of the illustrated GUI 900.

TABLE 5

ASSETS GUI FEATURES

| GUI FEATURE | Description |
| --- | --- |
| 905 - Source and Target Language Selection | Target language is normally English, but can be any language. Source language list may be automatically populated in descending order of probability for each language if language detection is incorporated. |
| 910 - Header Translation Controls | The user may choose whether to have ASSETS automatically translate column headers, and the user may initiate the column header translation process before selecting other settings. If in interactive mode, another dialog may allow the user to correct translations or to select alternative translations from an n-best list or header ontology. |
| 915 - Source/Translation Toggle Button | Button for toggling headers between translated and source views. There could be multiple header rows. |
| 920 - Entity Type Selection | The user may select an entity type for each column of interest, perhaps after performing header translation. The system may be set to automatically guess entity types, presenting the sorted, ranked list of possible entity types in the entity type dropdown list. |
| 925 - Action Selection | The user chooses the translation strategy, e.g., whether to translate, transliterate, keyword replace, etc. If GUI 900 is made generically with a lightweight service-oriented architecture ("SOA") underneath, the choice of actions may be determined by which services are registered to handle a specific category or entity type. For instance, a morphological analysis tool could be registered for all entity types, a date converter for date types, etc. |
| 930 - Sample Cell Output | This is a sample display for the most selected cell. The preview is based on the current entity type and action settings for the most selected cell's column. |
| 935 - Most Selected Cell Highlighting | The most selected cell may be relevant when row and/or column selection are/is enabled. For instance, when a column is selected, the most selected cell is the cell that is in focus or contains the cursor. |
| 940 - Preview Capability | This functionality allows the user to view the results for a range of rows based on the current settings for all columns. The preview capability may be useful for previewing and adjusting settings on large files. |
| 945 - Translation Options | The translation options allow the user to view results for a current translation or to push file and corresponding XML configuration file (generated by the GUI) to the server queue. |
| 950 - Font Size Selection | The GUI has an easy-to-access mechanism for making the font larger to display, for instance, foreign script fonts. |
| 955 - Search Tab | Search capabilities are included in the GUI that use ASSETS Name Sense Name Matching. |

Other GUI features (not shown) may include automatic and interactive error correction with the ability to save correction settings to a user adaptation/preferences file. A language information library giving users visual clues to help select encodings/scripts for unknown languages may also be included in the GUI.

Some embodiments of ASSETS translate isolated noun phrases in the absence of the linguistic or natural language context that is available to, and relied upon by, conventional full sentence translation approaches. Rather, the context in some embodiments of ASSETS may be derived from the group of isolated noun phrases. ASSETS may be language-independent, but configurable for specific languages using parameter settings and externally defined knowledge sources, such as databases 228-244 of FIG. 2, for example. Some embodiments of ASSETS may compensate for the lack of linguistic or natural language context by using machine learning and advanced reasoning techniques to classify the semantic category of each noun phrase according to a predefined semantic category ontology for noun phrases, principally covering proper noun phrases known as named entities. The term "named entity" refers to proper noun phrases of specific categories such as person name, place name or organization name. Category labels may be used throughout the ASSETS functionality for selecting both category-appropriate translation senses and category-specific translation strategies. The ASSETS functionality may employ a large-scale TM containing lists of pre-identified translation pairs followed by a suite of specialized translators for each noun phrase category. The category-specialized translators may employ various translation strategies. The TM may require category labels for retrieving category-appropriate translations from the TM's list of pre-determined translation pairs. A hybrid automatic translation approach may select translation components based on an association between a category and a translation strategy.

The ASSETS system may employ the ASSETS functionality on a larger scale, further exploiting noun-phrase categorization using context provided via structured data formats. The columnar organization of spreadsheets and database tables provides natural groupings of nearly homogenous category data. Some embodiments of ASSETS may either calculate the most probable semantic noun-phrase category for an entire column of related noun-phrases or allow users to specify the column category label. Column-based categorization may reduce classification errors, and, therefore, translation errors, by providing either a human judgment or a probability distribution for the categorization of an entire column of data rather than for an individual cell. Column categorization uses additional features not available to an individual cell categorizer, incorporating information obtained from column headers, distributional features derived from the entire column of data and advanced reasoning pertaining to the relationships among the columns. By default, the category label associated with a column may supersede the individual categorization of a single cell and may be provided by the ASSETS system based on system defaults or user specifications. The ASSETS functionality may use the provided category label or the automatically determined category label for selecting terminology from the TM as well as for selecting the appropriate translation strategy. The selected translation strategy may determine the combination of lexical senses, transfer rules and statistical models used during the final algorithmic phase of the translation. One translation strategy available in the system is essentially to "do nothing", meaning that some categories, once categorized, might not be translated but instead passed through the system intact (e.g. numbers, email addresses and dates).

Some embodiments of ASSETS exploit knowledge about semantic categories that is available in structured and semi-structured contexts. A column of data in a spreadsheet is normally a list of items that are grouped together by virtue of having the same category. Lists may contain one or more items. Individual items in a list may be referred to, alternatively, as a cell or as an isolated noun phrase. Lists provided to some embodiments of ASSETS are not forcibly derived from columns of a spreadsheet or a database table. The lists may also be manually assembled or grouped into like categories through the use of technologies such as information extraction.

Some embodiments of ASSETS provide a mechanism for allowing users to specify the category of a list or column of data. A column's category may be obtained by the user via automated means such as an information extraction engine, or the category may be manually selected based on observation of the data. If the user cannot or does not wish to specify the category of a column, ASSETS may provide an automatic column categorizer that uses ASSETS column categorization functionality to identify the most likely category of a list of data. Once the column's category has been established, each of the cells in the column is passed to the ASSETS category-driven isolated noun phrase translator for processing.

While the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any of these physical servers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. Further, some components may be left out for certain languages. For example, the morphological analyzer component may be left out for some source language, or the morphological analyzer may be substituted for, or complimented by, a part-of-speech tagger. Some languages may also include additional components. For instance, Arabic and Hebrew may require a vocalization in order to insert vowels into names for proper transliteration. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. An apparatus, comprising:
a processor; and
a memory, wherein the processor is configured to
   determine a category for a group of isolated noun phrases in a structured or semi-structured data source stored in the memory, wherein the group of isolated noun phrases comprises one or more isolated noun phrases; and
   translate the group of isolated noun phrases from a source language to a target language using a category-driven isolated noun phrase translation,
wherein the determination of the category and the category-driven isolated noun phrase translation are performed based on context derived from the group of isolated noun phrases;
wherein the processor is further configured to determine the category of the group of isolated noun phrases based on an automatic column categorization that identifies the most likely category of the group of isolated noun phrases that is obtained by combining results obtained for individual cells of the group of isolated noun phrases into a composite score for each category.

2. The apparatus of claim 1, wherein the processor is further configured to determine the most likely category for the group of isolated noun phrases as the category with the highest composite score.

3. The apparatus of claim 1, wherein the processor is further configured to only select the category with the highest composite score when the category with the highest composite score exceeds the category with the second highest composite score by a predetermined threshold.

4. The apparatus of claim 1, wherein the processor is further configured to determine the category of each individual cell using feature extraction and Bayesian statistics, or a Bayesian statistical model trained on data for which category labels are known.

5. The apparatus of claim 4, wherein features used for classification comprise one or more of data type characteristics, morpho-syntactic information, semantic features and categories, local distributional statistics and pattern-based features.

6. The apparatus of claim 1, wherein the processor is further configured to perform a hybrid category-driven isolated noun phrase transfer when a result for translating an isolated noun phrase from the source language to the target language is not found using the category-driven isolated noun phrase translation based on finding the isolated noun phrase in one or more translation memories or one or more dictionaries.

7. The apparatus of claim 6, wherein the processor is further configured to employ one or more of a transliteration only strategy, a key word replacement plus transliteration strategy, a category-driven lexical transfer strategy, a category-driven shallow syntactic transfer strategy or a statistical model translation strategy.

8. The apparatus of claim 1, wherein the processor is further configured to:
 employ a shallow syntactic transfer strategy comprising inputting category-specific rules;
 produce a translation graph by applying the category-specific rules; and
 choose the best path through the translation graph.

9. The apparatus of claim 1, wherein the processor is further configured to:
 determine whether transliteration is to be applied to all or part of an isolated noun phrase; and
 when transliteration is to be applied, use a transliteration standard to replace indicated parts of the isolated noun phrase with appropriate transliterations.

10. The apparatus of claim 1, wherein the processor is further configured to divide cell data for the group of isolated noun phrases into tokens representing word-like units that are looked up in at least one of a dictionary and a translation memory and associated with a set of grammatical and semantic features.

11. The apparatus of claim 10, wherein the processor is further configured to:
 inspect each token to determine whether the respective token should be submitted to morphological analysis;
 when it is determined that a token needs morphological analysis, perform lemmatization to find a citation form of the token along with a dictionary and translation memory lookup to retrieve information associated with the citation form of the token; and
 analyze affixes to determine grammatical characteristics marked by inflectional affixes.

12. A computer-implemented method, comprising:
 determining, by a processor, a category for a group of isolated noun phrases in a data source, wherein the group of isolated noun phrases comprises one or more isolated noun phrases; and
 translating, by the processor, the group of isolated noun phrases from a source language to a target language using a category-driven isolated noun phrase translation,
 wherein the determination of the category and the category-driven isolated noun phrase translation are performed based on context derived from the group of isolated noun phrases,
 wherein the category is determined based on an automatic column categorization that identifies the most likely category of the group of isolated noun phrases that is obtained by combining results obtained for individual cells of the group of isolated noun phrases into a composite score for each category.

13. The apparatus of claim 12, wherein the most likely category for the group of isolated noun phrases is determined as the category with the highest composite score.

14. The computer-implemented method of claim 12, wherein the category with the highest composite score is only selected when the category with the highest composite score exceeds the category with the second highest composite score by a predetermined threshold.

15. The computer-implemented method of claim 12, wherein the category of each individual cell is determined using feature extraction and Bayesian statistics, or a Bayesian statistical model trained on data for which category labels are known.

16. The computer-implemented method of claim 15, wherein features used for classification comprise one or more of data type characteristics, morpho-syntactic information, semantic features and categories, local distributional statistics and pattern-based features.

17. The computer-implemented method of claim 12, further comprising:
 performing a hybrid category-driven isolated noun phrase transfer when a result for translating an isolated noun phrase from the source language to the target language is not found using the category-driven isolated noun phrase translation based on finding the isolated noun phrase in one or more translation memories or one or more dictionaries.

18. The computer-implemented method of claim 17, wherein the translating further comprises employing one or more of a transliteration only strategy, a key word replacement plus transliteration strategy, a category-driven lexical transfer strategy, a category-driven shallow syntactic transfer strategy and a statistical model translation strategy.

19. The computer-implemented method of claim 12, wherein the translating further comprises employing a shallow syntactic transfer strategy comprising
 inputting category-specific rules,
 producing a translation graph by applying the category-specific rules, and
 choosing the best path through the translation graph.

20. The computer implemented method of claim 12, further comprising:
 determining whether transliteration is to be applied to all or part of an isolated noun phrase; and
 when transliteration is to be applied, using a transliteration standard to replace indicated parts of the isolated noun phrase with appropriate transliterations.

21. The computer-implemented method of claim 12, further comprising:
 dividing cell data for the group of isolated noun phrases into tokens representing word-like units that are looked up in at least one of a dictionary and a translation memory; and
 associating the tokens with a set of grammatical and semantic features.

22. The computer-implemented method of claim 21, further comprising:
- inspecting each token to determine whether the respective token should be submitted to morphological analysis;
- when it is determined that a token needs morphological analysis, performing lemmatization to find a citation form of the token along with a dictionary and translation memory lookup to retrieve information associated with the citation form of the token; and
- analyzing affixes to determine grammatical characteristics marked by inflectional affixes.

23. A computer program embodied on a non-transitory computer-readable medium, the program configured to control a processor to perform a process, the process comprising:
- determining a category for a group of isolated noun phrases in a data source, wherein the group of isolated noun phrases comprises one or more isolated noun phrases; and
- translating the group of isolated noun phrases from a source language to a target language using a category-driven isolated noun phrase translation,
- wherein the determination of the category and the category-driven isolated noun phrase translation are performed based on context derived from the group of isolated noun phrases,
- wherein the category is determined based on an automatic column categorization that identifies the most likely category of the group of isolated noun phrases that is obtained by combining results obtained for individual cells of the group of isolated noun phrases into a composite score for each category.

24. An apparatus, comprising:
- a processor; and
- memory, the processor comprising
- determining means for determining a category for a group of isolated noun phrases in a data source, wherein the group of isolated noun phrases comprises one or more isolated noun phrases; and
- translating means for translating the group of isolated noun phrases from a source language to a target language using a category-driven isolated noun phrase translation,
- wherein the determination of the category and the category-driven isolated noun phrase translation are performed based on context derived from the group of isolated noun phrases; and
- determining means for determining the category of the group of isolated noun phrases based on an automatic column categorization that identifies the most likely category of the group of isolated noun phrases that is obtained by combining results obtained for individual cells of the group of isolated noun phrases into a composite score for each category.

* * * * *